(No Model.)
J. T. QUINN.
HOUSEHOLD SIFTER.
No. 396,834. Patented Jan. 29, 1889.
Fig. 1.
Fig. 2.
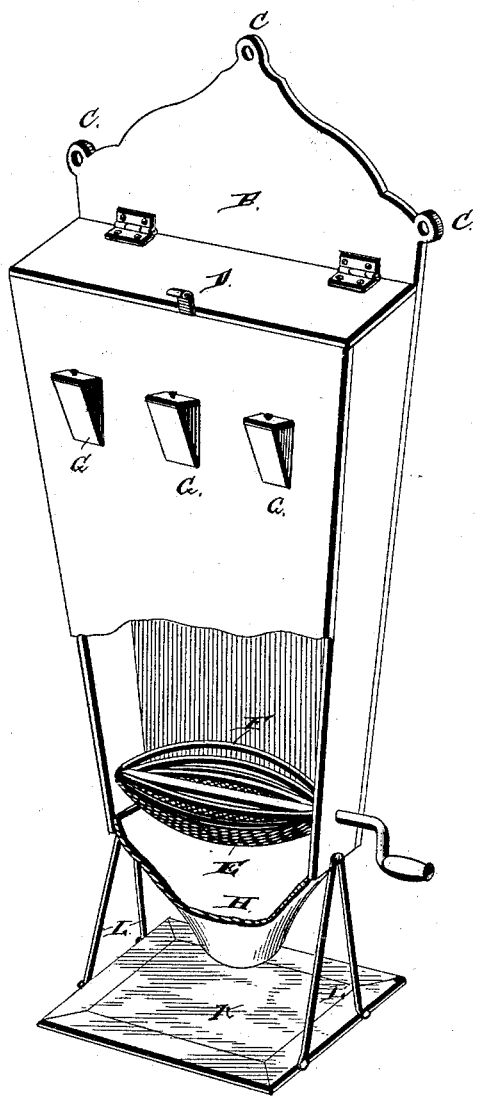
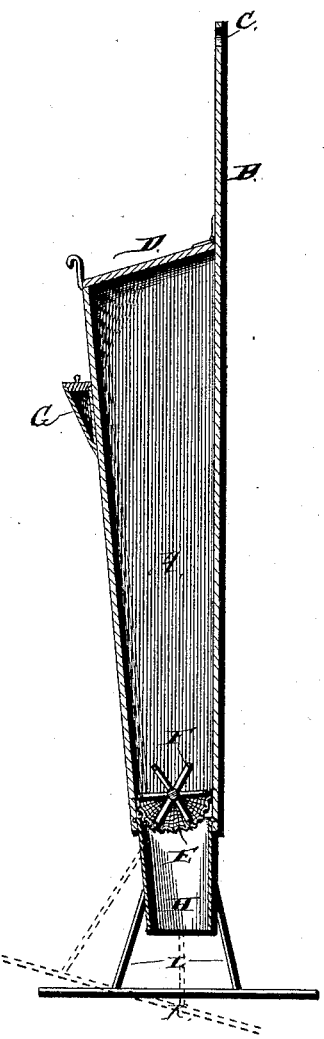
WITNESSES,
INVENTOR,

UNITED STATES PATENT OFFICE.

JOHN TITSWORTH QUINN, OF RIVERSIDE, CALIFORNIA.

HOUSEHOLD SIFTER.

SPECIFICATION forming part of Letters Patent No. 396,834, dated January 29, 1889.

Application filed June 13, 1888. Serial No. 276,922. (No model.)

*To all whom it may concern:*

Be it known that I, JOHN TITSWORTH QUINN, a citizen of the United States, residing at Riverside, in the county of San Bernardino and State of California, have invented a new and useful Improvement in Flour Bins and Sifters, of which the following is a specification.

The invention relates to a combined flour bin and sifter; and it consists in a certain novel construction and combination of devices, fully described hereinafter, and specifically pointed out in the claim.

In the accompanying drawings, wherein similar letters of reference denote corresponding parts in both the figures, Figure 1 is a perspective view of a combined flour bin and sifter embodying my improvements. Fig. 2 is a vertical central sectional view of the same.

Referring to the drawings, A designates the bin, having the back B, which is provided with the apertured ears C C, to enable the bin to be suspended from suitable nails or hooks on the wall; and D designates a lid which is hinged to the back and closes the upper end of the bin to exclude dust, insects, vermin, &c.

In the open lower end of the bin is arranged a screen, E, above which is mounted the rotary agitator F, having a crank on one end arranged on the outside of the bin, and on the front side of the bin are arranged the pockets or boxes G G, to contain salt, soda, and any other materials which are desired during the operation of cooking.

A funnel, H, is affixed in any preferred manner to the lower end of the bin below the screen, and below the open mouth of this funnel is supported the pan or holder K, which is held in position by the supporting-rods L L, which are arranged in pairs at opposite sides of the pan or holder, and are connected at their upper ends to the lower end of the bin.

I am aware that it is not new to provide a bin with a sifter at its lower end and arrange a supporting device under the sifter to hold the vessel which is to contain the sifted flour or meal, and I wish it to be understood that I do not claim this construction. It will be observed, however, that below the screen of the sifter is arranged a removable funnel to direct the flour or meal to the receiving-vessel and prevent drafts from scattering the same, and the pan or holder which is provided to support the said receiving-vessel is connected to the lower end of the bin in such a manner as to enable it to be adjusted forward and rearward to facilitate the adjustment and removal of the said receiving-vessel. The upper ends of the supporting-rods are pivoted to the bin and their lower ends are pivoted to the side edges of the pan, therefore allowing a free movement of the pan for the purpose of emptying the same of its contents.

Having described my invention, I claim—

In a combined flour or meal bin and sifter, the bin A, the screen in the lower end of the bin, the agitator mounted in the bin above the screen, and the tapering funnel affixed to the lower end of the bin below the screen, in combination with the pan or holder K, arranged under the mouth of the funnel, and the supporting-rods at opposite sides of the said pan or holder and pivotally connecting the same to the lower end of the bin, whereby the pan can be swung back and forth, substantially as specified.

In testimony that I claim the foregoing as my own I have hereto affixed my signature in presence of two witnesses.

JOHN TITSWORTH QUINN.

Witnesses:
   A. B. COX,
   JUDSON HOUSE.